United States Patent
Landschaft et al.

(10) Patent No.: US 7,277,713 B2
(45) Date of Patent: Oct. 2, 2007

(54) SENDER LOCATION IDENTIFIER, METHOD OF IDENTIFYING A SENDER LOCATION AND COMMUNICATION SYSTEM EMPLOYING THE SAME

(75) Inventors: Assaf Landschaft, Munich (DE); Laurent Mauguee, Munich (DE)

(73) Assignee: Agere Systems Inc., Allentown, PA (US)

( * ) Notice: Subject to any disclaimer, the term of this patent is extended or adjusted under 35 U.S.C. 154(b) by 26 days.

(21) Appl. No.: 11/175,564

(22) Filed: Jul. 6, 2005

(65) Prior Publication Data

US 2007/0010258 A1  Jan. 11, 2007

(51) Int. Cl.
*H04Q 7/20* (2006.01)
(52) U.S. Cl. .............. 455/456.1; 455/456.6; 455/418; 342/357.07; 342/357.01
(58) Field of Classification Search ........... 455/456.3, 455/466, 456.6, 456.1, 418; 342/357.07, 342/357.01
See application file for complete search history.

(56) References Cited

U.S. PATENT DOCUMENTS

| | | | |
|---|---|---|---|
| 2001/0026240 A1* | 10/2001 | Neher | 342/357.07 |
| 2001/0050631 A1* | 12/2001 | Takenaga | 342/357.13 |
| 2002/0129109 A1 | 9/2002 | Nozaki et al. | |
| 2003/0003909 A1* | 1/2003 | Keronen et al. | 455/434 |
| 2004/0072583 A1* | 4/2004 | Weng | 455/456.3 |
| 2004/0186890 A1 | 9/2004 | Huang et al. | |
| 2005/0147058 A1* | 7/2005 | Tarnanen et al. | 370/310 |
| 2005/0289095 A1* | 12/2005 | Rauhala et al. | 707/1 |
| 2006/0014531 A1* | 1/2006 | Nam et al. | 455/418 |
| 2006/0089153 A1* | 4/2006 | Sheynblat | 455/456.1 |
| 2006/0171348 A1* | 8/2006 | Nokano | 370/328 |

FOREIGN PATENT DOCUMENTS

| | | |
|---|---|---|
| WO | WO9721314 A | 6/1997 |
| WO | WO0130098 A | 4/2001 |
| WO | WO03071825 A | 8/2003 |

\* cited by examiner

*Primary Examiner*—Danh Le

(57) ABSTRACT

The present invention provides a sender location identifier for use with a short message service (SMS). In one embodiment, the sender location identifier includes a memory configured to provide a unique designator associated with a location of a mobile phone. Additionally, the sender location identifier also includes a sender identification unit coupled to the memory and configured to attach the unique designator to a short message transmission from the location of the mobile phone employing the SMS.

18 Claims, 2 Drawing Sheets

SENDER LOCATION IDENTIFIER, METHOD OF IDENTIFYING A SENDER LOCATION AND COMMUNICATION SYSTEM EMPLOYING THE SAME

TECHNICAL FIELD OF THE INVENTION

The present invention is directed, in general, to communication systems and, more specifically, to a sender location identifier, a method of identifying a sender location and a communication system employing the identifier or the method.

BACKGROUND OF THE INVENTION

Initially, mobile phones were used to communicate voice messages and rarely contained support for other features. Currently, mobile phones have become portable information exchange systems and entertainment centers having features that were only imagined a short time ago. For example, currently available mobile phones allow viewing of news, weather, sports and entertainment video updates and play cutting edge three-dimensional games. Features such as video on demand and audio on demand allow playing of video and audio clips. Movie and music fans can download content on their mobile phones, with just a few clicks, having sharpness and clarity. Video messaging and still pictures may be recorded and sent to any e-mail address. Many of these features require substantial airtime or additional charges that are not insignificant.

Short message service (SMS) is a mechanism of delivery of short messages over the mobile networks. It is a store and forward way of sending messages to and from mobile phones. Each short message can include up to 160 characters that can be alphanumeric (text) or binary non-text short messages. SMS has gained rapid popularity because it provides a permanent message, like e-mail, at a fraction of the cost of voice or video messaging and can be sent and received essentially without the interruption that is usually associated with voice communication. However, its absence of other enhancing features limits its usefulness beyond the present.

Accordingly, what is needed in the art is a way to provide an enhancing feature for SMS and particularly one that increases the utility and value associated with employing short messages.

SUMMARY OF THE INVENTION

To address the above-discussed deficiencies of the prior art, the present invention provides a sender location identifier for use with a short message service (SMS). In one embodiment, the sender location identifier includes a memory configured to provide a unique designator associated with a location of a mobile phone. Additionally, the sender location identifier also includes a sender identification unit coupled to the memory and configured to attach the unique designator to a short message transmission from the location of the mobile phone employing the SMS.

In another aspect, the present invention provides a method of identifying a sender location for use with a short message service (SMS). The method includes providing a unique designator associated with a location of a mobile phone and attaching the unique designator to a short message transmission from the location of the mobile phone employing the SMS.

The present invention also provides, in yet another aspect, a communication system. The communication system includes a communication network providing a short message service (SMS), sending and receiving mobile phones coupled to the communication network and a sender location identifier for use with the SMS. In the illustrated embodiment, the sender location identifier has a memory that provides a unique designator associated with a location of the sending mobile phone and a sender identification unit, coupled to the memory, that attaches the unique designator to a short message transmission from the location of the sending mobile phone employing the SMS. The sender location identifier also has a location identification unit, coupled to the sender identification unit and associated with one of the receiving mobile phone and the communication network, that identifies the location of the sending mobile phone based on the unique designator.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
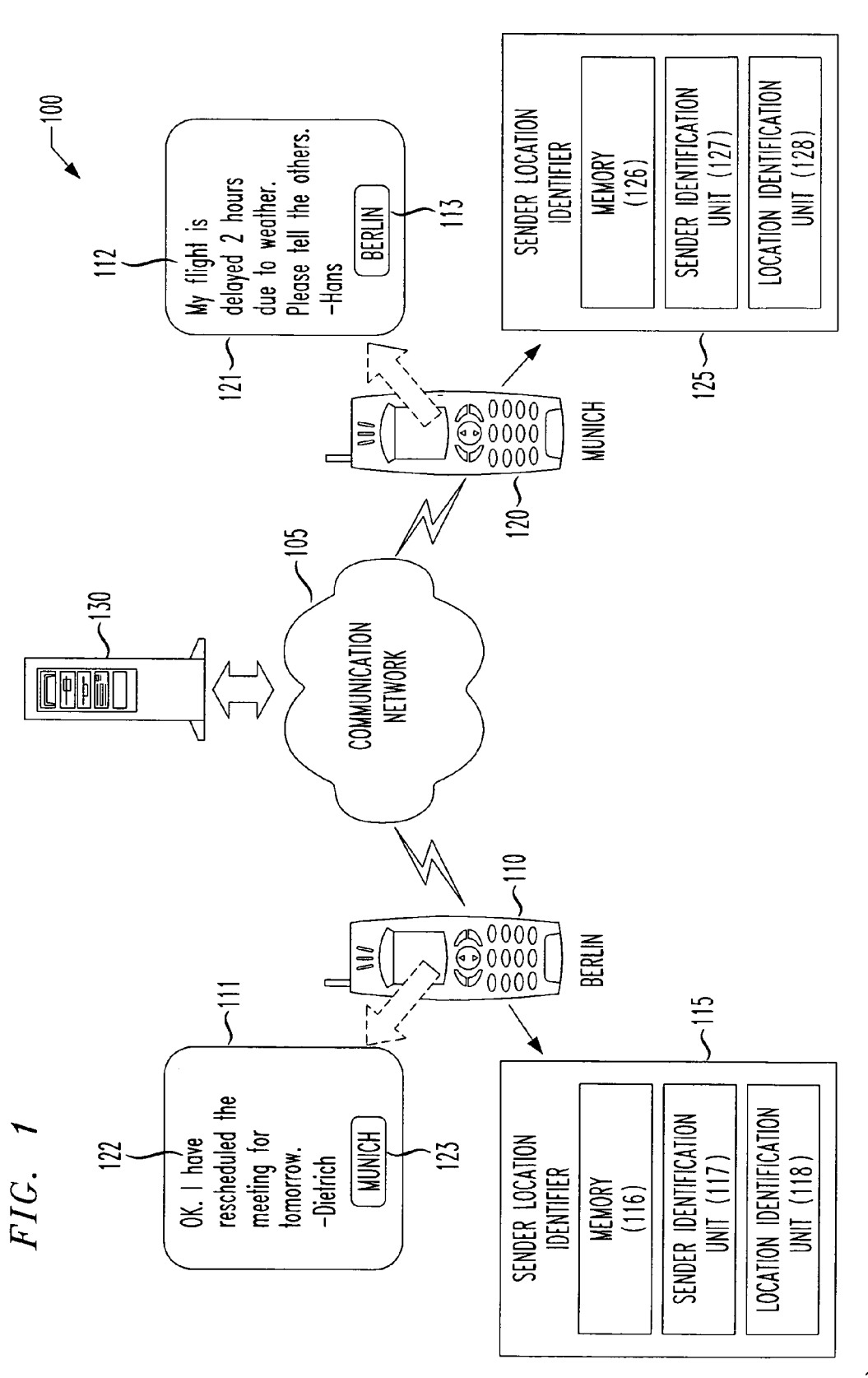
FIG. 1 illustrates a system diagram of an embodiment of a communication system constructed in accordance with the principles of the present invention.

Referring initially to FIG. 1, illustrated is a system diagram of an embodiment of a communication system, generally designated 100, constructed in accordance with the principles of the present invention. The communication system 100 includes a communication network 105 that provides a short message service (SMS), first and second mobile phones 110, 120 and a network server 130, which are all coupled to the communication network 105, as shown. In the illustrated embodiment, a first user located in Berlin employs the first mobile phone 110, and a second user located in Munich employs the second mobile phone 120.

The first mobile phone 110 employs a first display 111 and includes a first sender location identifier 115 having a first memory 116, a first sender identification unit 117 and a first location identification unit 118. The second mobile phone 120 employs a second display 121 and includes a second sender location identifier 125 having a second memory 126, a second sender identification unit 127 and a second location identification unit 128. In the illustrated embodiment, the first and second sender location identifiers 115, 125 are software implementations that may be built on existing hardware thereby allowing efficient use of an installed equipment base by adding both utility and value. In an alternative embodiment, they may be a hybrid combination of software and hardware or produced completely in a hardware implementation.

Additionally, the first and second location identification units 118, 128 may be associated directly with the communication network 105 instead of the first and second mobile phones 110, 120, as shown in FIG. 1. This feature allows information concerning user locations to be held in a more secure environment thereby reducing intentional distortions or corruptions of the location data.

Initially, the first user located in Berlin employs the first mobile phone 110 (the sending mobile phone) to send a text message as a first short message transmission 112, employing the SMS of the communication network 105, to the second mobile phone 120 (the receiving mobile phone), which displays it on the second display 121. The first sender location identifier 115 employs the first memory 116 to provide a first unique designator associated with the Berlin location of the first mobile phone 110. Correspondingly, the first sender identification unit 117, which is coupled to the first memory 116, attaches the first unique designator to the first short message transmission 112. The second location identification unit 128 is coupled to the first sender identification unit 117 and identifies the location of the first mobile phone 110 (i.e., Berlin), based on this first unique designator. A first sender location indicator 113 provided on the second display 121 shows that the first short message transmission 112 was sent from Berlin.

In response, the second user located in Munich sends a second short message transmission 122 from the second mobile phone 120 (now the sending mobile phone) to the first mobile phone 110 (now the receiving mobile phone), which is displayed on the first display 111, as shown. In corresponding manner, the second memory 126 provides a second unique designator associated with the Munich location of the second mobile phone 120. The second sender identification unit 127, which is coupled to the second memory 126, attaches this second unique designator to the second short message transmission 122. The first location identification unit 118 is coupled to the second sender identification unit 127 and employs the second unique designator to identify the location of the second mobile phone (i.e., Munich), based on the second unique designator. A second sender location indicator 123 provided on the first display 111 shows that the second short message transmission 122 was sent from Munich.

In the illustrated embodiment, the first and second unique designators are automatically attached to the first and second short message transmissions. In an alternative embodiment, the attachment of the unique designator may be disabled completely or accomplished only at the initiation of the short message sender.

In one embodiment of the present invention, the communications network 105 is a Global System for Mobile Communications/Universal Mobile Telecommunications System (GMS/UMTS), and the first and second unique designators are first and second Cell-IDs associated with GSM masts servicing the first and second mobile phones 110. 120. Each GSM mast sends its Cell-ID thereby allowing reading the Cell-ID of the nearest mast associated with GSM. Gathering these Cell-IDs along with their accompanying locations into a Cell-ID database allows identification of current physical locations.

In the communication system 100, a network database is maintained in the network server 130 that provides a collection of unique designators, such as the Cell-IDs discussed above, that allow identification of mobile phone locations. This network database may be queried by the first and second location identification units 118, 128 to match received unique designators with physical locations of sending mobile phones. Alternatively, the first and second location identification units 118, 128 may employ local databases located within each of the first and second mobile phones 110, 120, respectively. These local databases may be provided through routine software upgrades or be downloaded from the communication network 105. The first and second location identification units 118, 128 may employ either of the network or local databases to retrieve a text string that describes the specific cell based on its unique designator.

Additionally, the databases may be either a public database available on the Internet (for example, http://janus.liebregts.nl/cellid/NL/) or a private database. Network operators provide their own full databases and are able to offer them as a service for their users. These databases can be downloaded to the user's mobile phone and used locally, as discussed above. Alternatively, these databases may be accessed online employing the Internet.

Figure 2:
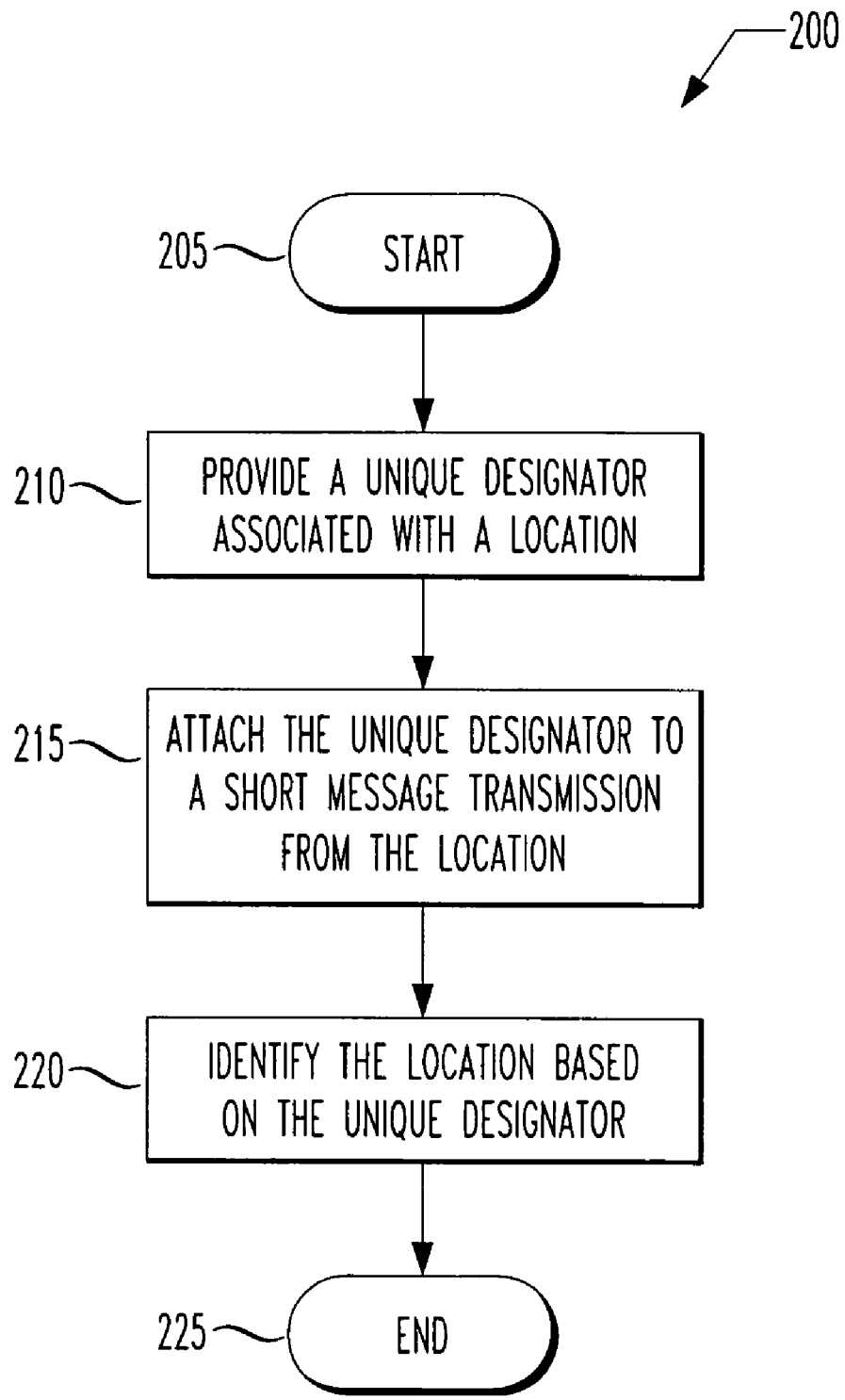
FIG. 2 illustrates a flow diagram of an embodiment of a method of identifying a sender location carried out in accordance with the principles of the present invention.

Turning now to FIG. 2, illustrated is a flow diagram of an embodiment of a method of identifying a sender location, generally designated 200, carried out in accordance with the principles of the present invention. The method 200 is for use with a short message service (SMS) and starts in a step 205. Then, a unique designator associated with a location of a mobile phone is provided in a step 210. In one embodiment, the unique designator is a Cell-ID associated with a mobile phone cell that is providing service to the mobile phone. Of course, other unique designators may be employed as appropriate to an existing or future application.

The unique designator is attached to a short message transmission, which is typically a text message, from the location of the mobile phone employing the SMS, in a step 215. Attaching the unique designator to the short message transmission may employ one of several attachment modes. For example, the unique identifier may be attached automatically to all short message transmissions or to a selected group of short message transmissions. Alternatively, the unique designator may be attached to the short message transmission in a user-initiated attachment mode, wherein the user has to manually designate that it be attached.

Then, in a step 220, the location of the mobile phone is identified based on the unique designator. Identifying the location of the mobile phone employs either a network database that is queried through a communication network that may be either public or private employing the Internet or another communications medium. Additionally, the location may be determined locally employing a receiving mobile phone having a local database that has either been preprogrammed or downloaded for such purpose. In one embodiment of the present invention, the network database and the local database employ call-ID databases. The method 200 ends in a step 225.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

In summary, embodiments of the present invention employing a sender location identifier, a method of identifying a sender location and a communication system employing the identifier or the method have been presented. Advantages include allowing an automatic exchange of physical locations that is a feature desired by many users of mobile phones. For example, users may "check-on" their loved ones by exchanging SMS messages with them and being able to determine their approximate location. This capability is of particular benefit when communicating with teenage children or caregivers of aging parents. Additionally, embodiments of the present invention may typically be implemented on existing communications hardware by employing software modifications, thereby adding both utility and value to an existing installed equipment base.

Although the present invention has been described in detail, those skilled in the art should understand that they can make various changes, substitutions and alterations herein without departing from the spirit and scope of the invention in its broadest form.

What is claimed is:

1. A sender location identifier for use with a short message service (SMS), comprising:
   a memory configured to provide a unique designator associated with a location of a mobile phone, wherein said unique designator is a Cell-ID identifying an antenna of a specific cell of a communication network nearest to and servicing said mobile phone; and
   a sender identification unit coupled to said memory and configured to automatically attach said unique designator to a short message transmission from said location of said mobile phone employing said SMS.

2. The identifier as recited in claim 1 further comprising a location identification unit coupled to said sender identification unit and configured to identify said location of said mobile phone based on said unique designator.

3. The identifier as recited in claim 2 wherein said location based on said unique designator employs one selected from the group consisting of:
   a network database; and
   a local database.

4. The identifier as recited in claim 3 wherein said network database and said local database employ a Cell-ID database.

5. The identifier as recited in claim 2 wherein the Internet is employed to identify said location of said mobile phone.

6. The identifier as recited in claim 1 wherein said short message transmission is a text message.

7. A method of identifying a sender location for use with a short message service (SMS), comprising:
   providing a unique designator associated with a location of a mobile phone, wherein said unique designator is a Cell-ID identifying a specific cell servicing said mobile phone said Cell-ID identifies an antenna of a communication network nearest to said mobile phone; and
   automatically attaching said unique designator to a short message transmission from said location of said mobile phone employing said SMS.

8. The method as recited in claim 7 further comprising identifying said location of said mobile phone based on said unique designator.

9. The method as recited in claim 8 wherein said location based on said unique designator employs one selected from the group consisting of:
   a network database; and
   a local database.

10. The method as recited in claim 9 wherein said network database and said local database employ a Cell-ID database.

11. The method as recited in claim 8 wherein the Internet is employed to identify said location of said mobile phone.

12. The method as recited in claim 7 wherein said short message transmission is a text message.

13. A communication system, comprising:
   a communication network providing a short message service (SMS);
   sending and receiving mobile phones coupled to said communication network;
   a sender location identifier for use with said SMS, including:
      a memory that provides a unique designator associated with a location of said sending mobile phone wherein said unique designator is a Cell-ID identifying a specific cell servicing said sending mobile phone,
      a sender identification unit, coupled to said memory, that automatically attaches said unique designator to a short message transmission from said location of said sending mobile phone employing said SMS, and
      a location identification unit, coupled to said sender identification unit and associated with one of said receiving mobile phone and said communication network, that identifies said location of said sending mobile phone based on said unique designator.

14. The system as recited in claim 13 wherein said Cell-ID identifies an antenna of said communications network nearest to said sending mobile phone.

15. The system as recited in claim 13 wherein identification of said location based on said unique designator employs one selected from the group consisting of:
   a network database; and
   a local database.

16. The system as recited in claim 15 wherein said network database and said local database employ a Cell-ID database.

17. The system as recited in claim 13 wherein the Internet is employed to identify said location of said sending mobile phone.

18. The system as recited in claim 13 wherein said short message transmission is a text message.

* * * * *